Feb. 7, 1939. J. N. HUNTER Re. 20,998

APPARATUS FOR TRAPPING DUST ARISING IN BORE HOLES

Original Filed Jan. 8, 1936

INVENTOR.

BY John Norman Hunter

Williams, Rick & Thorp

ATTORNEYS

Reissued Feb. 7, 1939

Re. 20,998

UNITED STATES PATENT OFFICE 20,998

APPARATUS FOR TRAPPING DUST ARISING IN BORE HOLES

John Norman Hunter, Norbury, England, assignor to Pyrene Manufacturing Company, Newark, N. J., a corporation of Delaware Original No. 2,107,864, dated February 8, 1938, Serial No. 58,043, January 8, 1936. Application for reissue June 14, 1938, Serial No. 213,656. In Great Britain February 6, 1935

3 Claims. (Cl. 255—50)

This invention relates to that kind of apparatus for trapping dust arising in bore holes in which suction is applied to a conduit through which dust-laden air is drawn away from the mouth of the hole, usually to some form of filter.

According to the invention a suction tube arranged to surround a drill shank is formed with a mouth which is adapted to enter the mouth of a bore hole and which is preferably tapered for this purpose, and is also formed with a connection through which suction may be applied. Thus when the end of the suction tube has been lodged in the bore hole the tube serves not only as a receiver for the dust but also as a guide for the drill shank. The tube is preferably made of spring steel or equivalent resilient material and is slotted or slit at the mouth end so that the latter can bear tightly against the wall of the bore hole.

In order to catch any dust that arises when drilling starts, a hood may be mounted on the suction tube and arranged to surround the end of the drill when a drilling operation is being begun, that is to say before a hole of sufficient depth has been made to receive the mouth of the suction tube.

In order that the invention may be clearly understood and readily carried into effect two apparatus constructed in accordance therewith will now be described by way of example with reference to the accompanying drawing, in which the two figures respectively show these apparatus partly in section.

Figure 1:
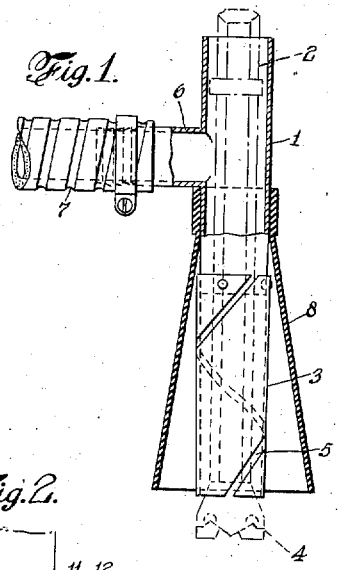
Figure 2:
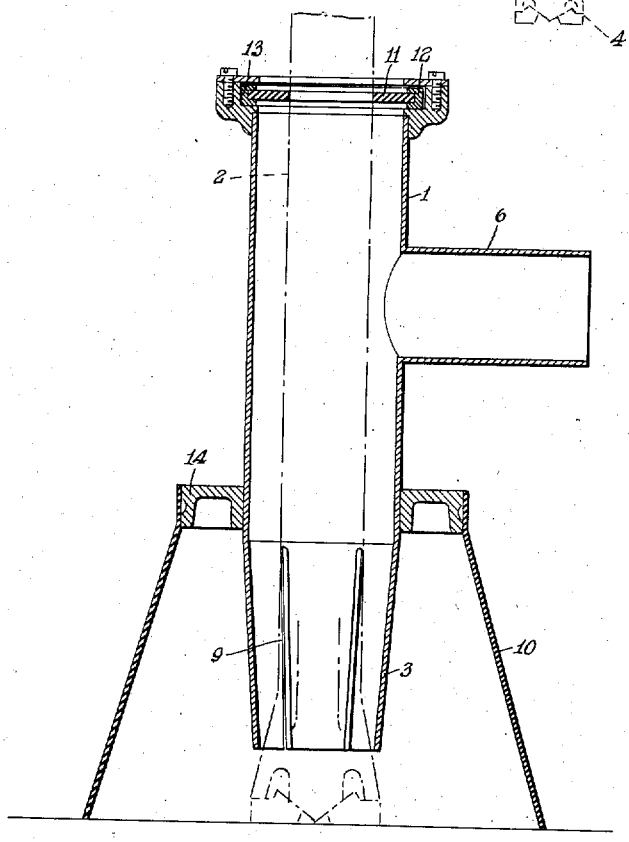

Fig. 1 is an elevational view, partly in section, of one embodiment of my invention and Fig. 2 is a similar view of a modified form.

Referring first to Fig. 1, a suction tube or shell 1 forming an outlet chamber is arranged around the shank 2 of a drill, and at the mouth end is formed with a tapering portion or spout 3, the mouth of which is narrower than the bit 4 of the drill. The tapered portion is formed with a slot or opening 5 which runs helically around it. A branch or outlet 6 is connected by a flexible pipe 7 to an ejector or other form of suction pipe which causes the dust to be drawn away from the bore hole during the drilling. A flexible hood or skirt 8 surrounds the suction tube 1 and can be pushed either into the position shown in Fig. 1 or into a position in which the free end of the hood projects beyond the bit 4. As a rule when drilling begins the hood is pushed forward so that its edge bears on the rock face and surrounds the area upon which the drill acts. However, if considerable suction is applied through the branch pipe 6 it is found that the dust initially formed is drawn into the annular chamber within the hood and through the slot 5 into the outlet chamber, even if the hood is in the position shown in Fig. 1. In practice the operator supports the end of the drill shank by holding the suction tube 1 in one hand, and as drilling proceeds the tube enters the hole. As soon as the hole has been made sufficiently deep to support the end of the suction tube there is no longer any need for the operator to hold this tube.

As is clearly shown by Fig. 1, the suction tube is made of such diameter that the drill shank can revolve freely and does not obstruct the free flow of dust up the tube and through the branch 6.

In the construction shown in Fig. 2, the mouth end of the spout 3 of the tube or shell 1 is formed with straight longitudinal slits or openings 9 and is surrounded by a hood or skirt 10 of a slightly different design from that shown in Fig. 1. In this case the flexible conical part of the hood is carried by a stiff annular member 14 which may be arranged to slide on the tube 1.

If the suction exerted through the branch or outlet 6 is insufficient to insure that all the dust is drawn through the branch 6, the end of the tube may be positively sealed, as shown in Fig. 2, to prevent any air escaping between the tube and the drill shank 2. This sealing is effected by an annular rubber disc 11 which fits around the drill shank 2 and is covered by a metal ring 12 at its rim. This rim 12 lies in a groove formed in a casting 13 fixed to the end of the tube 1 and floats in this groove so that the whole seal also constitutes a bearing for the drill shank 2.

It will be understood that the invention may assume forms other than those herein shown and described without departing from the spirit of the invention or the scope of the following claims.

What is claimed is:

1. An apparatus for trapping dust arising in bore holes, comprising a tube of resilient metal adapted to surround a drill shank and provided with a connection through which suction may be induced, the wall of said tube being gradually tapered throughout a substantial portion of its length to facilitate its partial entrance into a bore hole and slotted also throughout a substantial portion of its length to render it readily contractible under the impinging action exerted thereon by the wall of the bore hole as it enters the same, the slotted area of said wall being sufficiently long to serve as a passage through which air is drawn into the tube from the vicinity of the outer end of the bore hole under the action of induced suction within the tube during such time as the tapered end of the tube is partially disposed within the bore hole.

2. An apparatus for trapping dust arising in bore holes, comprising a tube of resilient metal adapted to surround a drill shank and provided with a connection through which suction may be induced, the wall of said tube being gradually tapered throughout a substantial portion of its length to facilitate its entering a bore hole and slotted also throughout a substantial portion of its length to render it readily contractible under the impinging action exerted thereon by the wall of the bore hole as it enters the same, the slotted area of said wall extending along a helical path and serving as a passage through which air is drawn into the tube from the vicinity of the outer end of the bore hole under the action of induced suction within the tube during such time as the tapered end of the tube is disposed within the bore hole.

3. A drill hood including a shell closed at one end creating an outlet chamber, a spout smaller in diameter than said shell projecting from the opposite end of said shell and having openings into said outlet chamber, a skirt projecting from said shell and surrounding said spout creating an annular chamber communicating with said openings, and an outlet from said outlet chamber.

JOHN NORMAN HUNTER.